United States Patent
Croglio, Jr. et al.

(10) Patent No.: US 12,313,461 B2
(45) Date of Patent: May 27, 2025

(54) MULTI-SECTIONED WINDOW FOR SPECTROSCOPIC DEVICE

(71) Applicant: Endress+Hauser Optical Analysis, Inc., Ann Arbor, MI (US)

(72) Inventors: Nicholas J. Croglio, Jr., Burbank, CA (US); Peter Scott, Glendora, CA (US); Douglas H. Beyer, Redlands, CA (US)

(73) Assignee: Endress+Hauser Optical Analysis, Inc., Ann Arbor, MI (US)

( * ) Notice: Subject to any disclaimer, the term of this patent is extended or adjusted under 35 U.S.C. 154(b) by 220 days.

(21) Appl. No.: 18/159,216

(22) Filed: Jan. 25, 2023

(65) Prior Publication Data

US 2024/0247980 A1 Jul. 25, 2024

(51) Int. Cl.
  *G02B 1/11* (2015.01)
  *G01J 3/02* (2006.01)
  *G01J 3/45* (2006.01)

(52) U.S. Cl.
  CPC .......... *G01J 3/021* (2013.01); *G01J 3/45* (2013.01); *G02B 1/11* (2013.01)

(58) Field of Classification Search
  CPC .... G02B 1/11; G01J 3/45; G01J 3/021; G01B 9/02003
  See application file for complete search history.

(56) References Cited

FOREIGN PATENT DOCUMENTS

WO    WO-03106919 A2 * 12/2003 ......... G01B 9/02003

\* cited by examiner

*Primary Examiner* — Maurice C Smith
(74) *Attorney, Agent, or Firm* — Kelly J. Smith; Endress+Hauser (USA) Holding, Inc.

(57) ABSTRACT

The present disclosure includes an optical head for a spectroscopic device configured to produce a beam of light, a reference signal detector, and a signal detector. A mirror reflects the beam of light from the light source toward a multi-sectioned window having a top side and a bottom side. The bottom side includes an AR coating and the top side has a first section including an AR coating and a second section including a beam splitter with transmittance and reflectance. A first beam path for the beam of light is defined by the mirror, the second section of the multi-sectioned window, and the reference signal detector. A second beam path for the beam of light is defined by the mirror, the second section of the multi-sectioned window, a medium contained in the spectroscopic device, an additional mirror, the first section of the multi-sectioned window, and the signal detector.

17 Claims, 2 Drawing Sheets

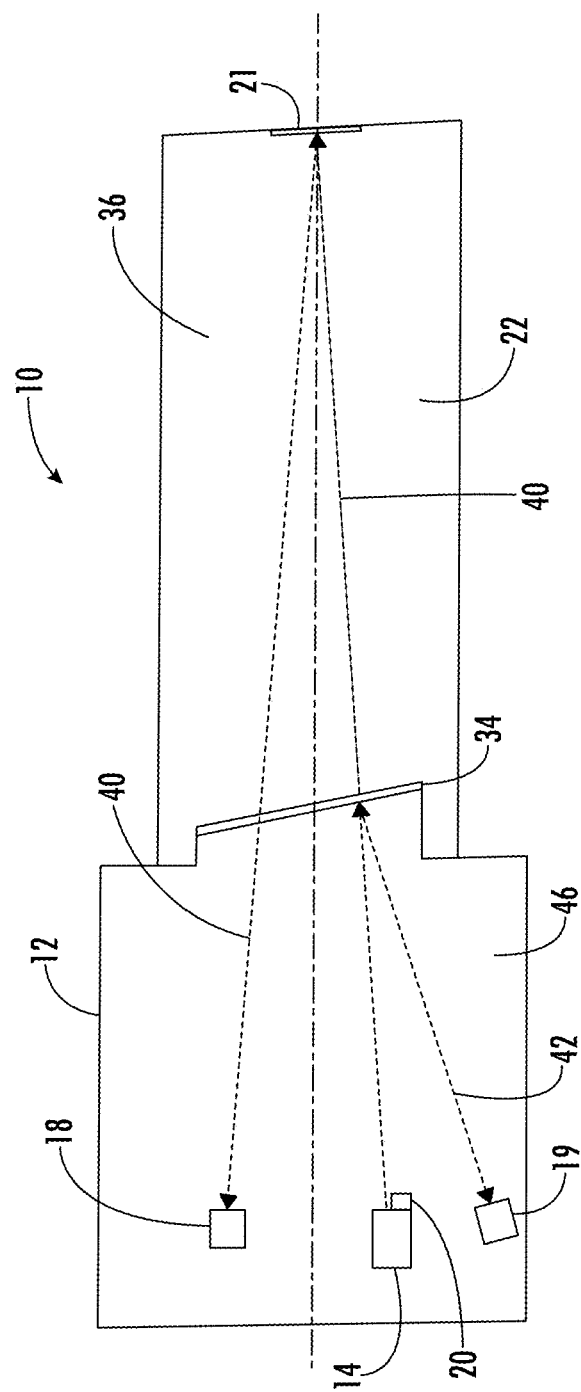
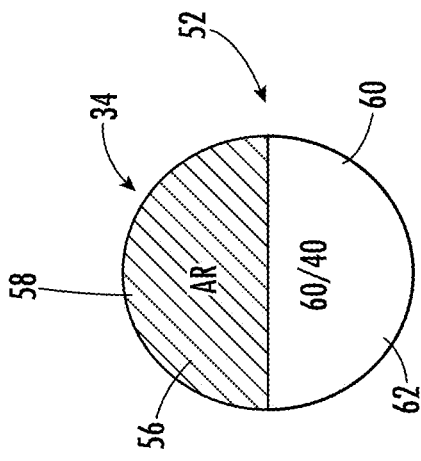
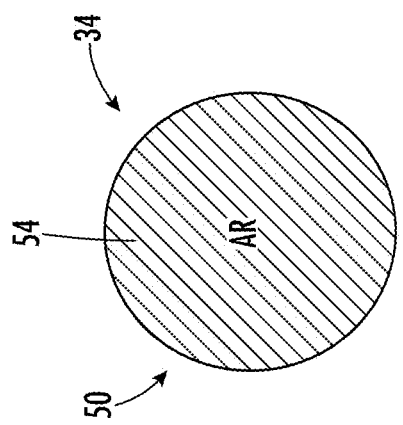

MULTI-SECTIONED WINDOW FOR SPECTROSCOPIC DEVICE

TECHNICAL FIELD

The present disclosure generally relates to a spectroscopic device including a multi-sectioned window.

BACKGROUND

Cyclic error may be reduced through window design or by using reference channels, and strategies to control optical power. Typically, reference channels are created by adding beam splitters into the beam, sometimes along with mirrors to direct a portion of the beam toward a detector. Each one of the added optics adds to the cost of the optic(s) and, additionally, the optic holder(s) adds to the cost of the optic(s). In addition, each optical surface can create cyclic error.

Accordingly, there remains a need for further contributions in this area of technology.

SUMMARY

In one aspect, the present disclosure includes an optical head for a spectroscopic device configured to produce a beam of light, a reference signal detector, and a signal detector. A mirror reflects the beam of light from the light source toward a multi-sectioned window having a top side and a bottom side. The bottom side includes an AR coating and the top side has a first section including an AR coating and a second section including a beam splitter with transmittance and reflectance. A first beam path for the beam of light is defined by the mirror, the second section of the multi-sectioned window, and the reference signal detector. A second beam path for the beam of light is defined by the mirror, the second section of the multi-sectioned window, a medium contained in the spectroscopic device, an additional mirror, the first section of the multi-sectioned window, and the signal detector.

In another aspect, a method for operating a spectroscopic device includes providing a light source configured to produce a beam of light, a reference signal detector, a signal detector, and a multi-sectioned window. The multi-sectioned window has a top side and a bottom side, wherein the bottom side includes an AR coating and the top side has a first section including an AR coating and a second section including a beam splitter with transmittance and reflectance. The method also includes directing the beam of light toward the multi-sectioned window, reflecting a portion of the beam of light from the second section of the multi-sectioned window to the reference signal detector, transmitting an additional portion of the beam of light through the second section of the multi-sectioned window through a medium contained in the spectroscopic device, and reflecting the additional portion of the beam of light back through the medium and through the first section of the multi-sectioned window to the signal detector.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein:

FIG. 1 shows a schematic illustration of a spectroscopic device, according to the present disclosure;

FIG. 2 shows a top view of an exemplary window of the present disclosure;

FIG. 3 shows a bottom view of the exemplary window of FIG. 1; and

DETAILED DESCRIPTION

Figure 4:
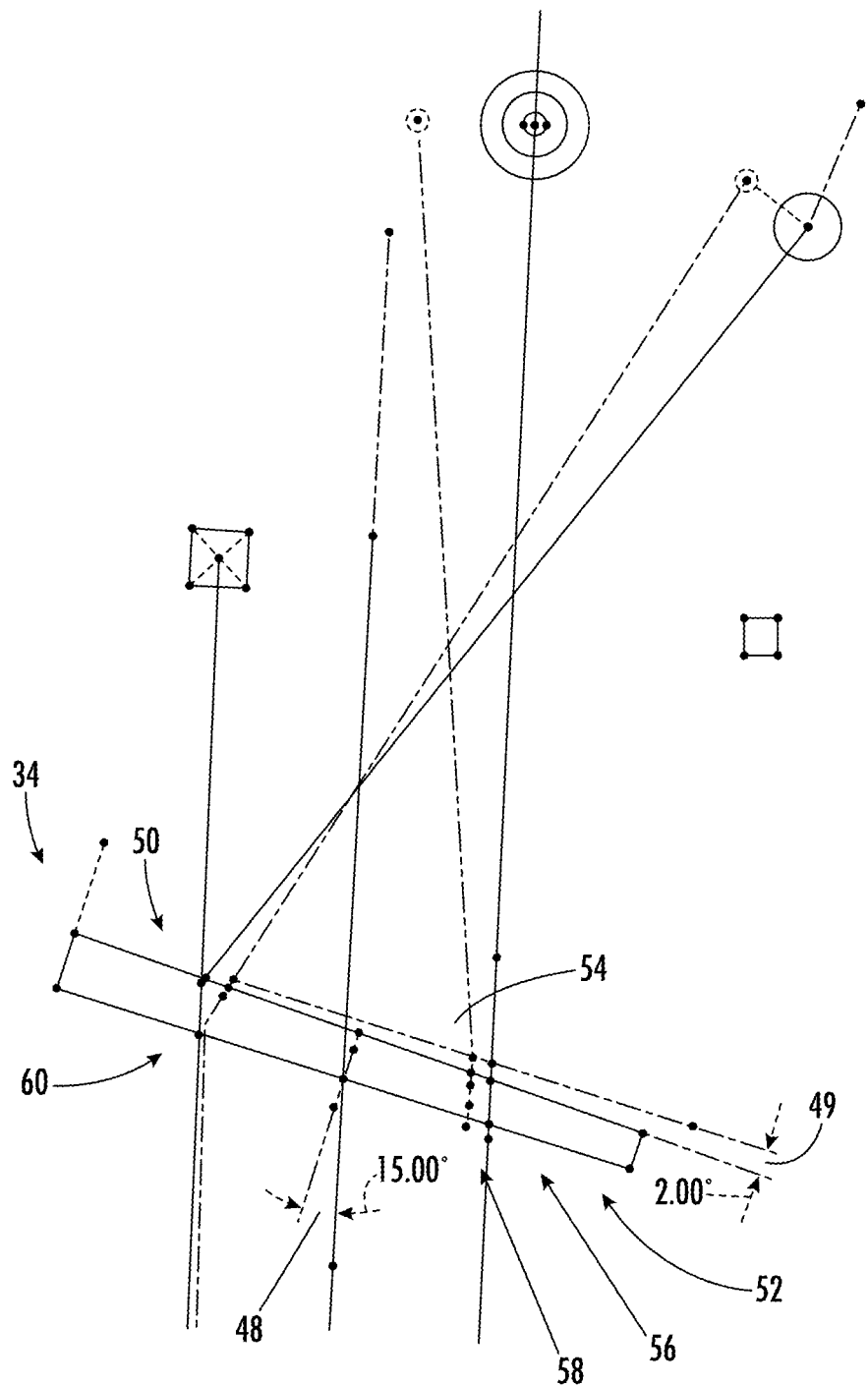
FIG. 4 shows a window for use with the spectroscopic device of FIG. 1, according to the present disclosure.

FIG. 1 shows a schematic illustration of an exemplary spectroscopic device 10, according to the present disclosure. In particular, the basic design of an exemplary TDL analyzer 10 is shown. Some of the principal components of the analyzer 10 are: an optical head 12 housing a light source such as a laser 14, one or more solid state detectors 18, 19 and one or more mirrors 20, 21. The mirror(s) 20, 21 may be used to manipulate a beam of light received from the laser 14.

According to an exemplary embodiment, the spectroscopic device 10 may also include a sample cell 22, with the mirror 21 positioned at the end opposite the laser 14, a gas inlet connection, a gas outlet connection, temperature sensors, and pressure sensors (not all components are shown). A multi-sectioned window 34, occupying an aperture, described in greater detail below, isolates the laser 14 and the detectors 18, 19 from process gas 36 inside the sample cell 22, such as by using a gas tight seal. This design allows measurements to be performed without contact between the process gas 36 (and any entrained contaminants) and critical analyzer components. As described in more detail below, the multi-sectioned window 34, may perform at least the functions of beam splitting, reflectance, and transmittance. According to some embodiments, at least one of the components of the optical head 12 includes a dielectric coating.

In operation, process gas 36 from a sampling probe is introduced into the sample cell 22 of the analyzer 10. The tunable diode laser 14 emits a wavelength of near-infrared (NIR) light specific for the target analyte into the sample cell 22 where it passes through the gas 36 and is reflected back by the mirror 21 at the opposite end of the cell to one of the detectors 18, 19. For example, detector 18 may be a signal detector designated to receive light reflected from the mirror 21.

In addition, detector 19 may be a reference signal detector designated to receive light from the tunable diode laser 14 with the light being reflected by the mirror 20 toward the multi-sectioned window 34. In this case, the light is reflected from the multi-sectioned window 34 toward the reference signal detector 19 rather than through the sample cell 22. According to the exemplary embodiment, the multi-sectioned window 34 may be or may include a beam splitter for directing a portion of the light toward the reference signal detector 19 (without passing through the sample cell 22) and another portion of the light through the sample cell 22.

Analyte molecules present in the gas sample 36 absorb and reduce the intensity of laser light energy in direct proportion to their concentration according to the Lambert-Beer law. The difference in light intensity is measured by one of the detectors 18, 19 and this signal is processed using advanced algorithms to calculate analyte concentration in the process gas 36.

Additional or alternative components may include a partially reflective metallic coating, and a beam splitting element, such as a diffractive beam splitter, a holographic beam splitter, or a diffraction-grating beam splitter. Further additional or alternative components may include acousto-optical component or an electro-optical component.

Exemplary beam paths 40, 42 may be established during operation, as described above. A first beam path 42 for a beam of light from the laser 14 may be defined by the laser 14, mirror 20, multi-sectioned window 34, reference cell 46, and reference signal detector 19. Optics components may include components that are used to alter the state of light through a variety of means, including filtering, reflecting, etc. A second beam path 40 for a beam of light from the laser 14 may be defined by the laser 14, one or more optics components 44, mirror 20, multi-sectioned window 34, process gas 36, mirror 21, back through the multi-sectioned window 34, and signal detector 18. It should be appreciated that a single beam system has only one beam of light, while a double beam system has two beams of light, one passing through a reference solution and one passing through a sample.

The mirror 20 may be positioned to redirect the beam of light from the light source 14 toward the multi-sectioned window 34. The multi-sectioned window 34, which will be described in greater detail below, may also function as a beam splitter and may direct a portion of the beam of light along the first beam path 42 and another portion of the beam of light along the second beam path 40. The first beam path 42 may pass through a reference sample and the second beam path 40 may pass through a test sample. The spectroscopic device 10 is configured to measure the light intensity between the first beam path 42 and the second beam path 40. According to other embodiments, the spectroscopic device 10 measures the relative light intensity of a single beam before and after a test sample is inserted.

Turning now to FIGS. 2 and 3, the multi-sectioned window 34 of the present disclosure will be discussed in greater detail. As stated above, the multi-sectioned window 34 isolates the laser 14 and the detectors 18, 19 from process gas 36 inside the sample cell 22. The multi-sectioned window 34 includes a top side, or front surface, 52 and a bottom side, or back surface, 50. The bottom side 50 (FIG. 2) includes an anti-reflective (AR) coating 54 and the top side 50 (FIG. 3) has a first section 56 including an AR coating 58 and a second section 60 including a beam splitter with transmittance and reflectance (with reference numeral 62 generally referencing the beam splitter, or beam splitter element, with transmittance and reflectance).

As stated above, the bottom side 50 of the multi-sectioned window 34 and the first section 56 of the top side 52 include AR coatings 54, 58. An AR coating is a type of optical coating applied to the surface of a lens or other optical element to reduce reflection. AR coatings are applied to optical surfaces to increase the throughput of a system and reduce hazards caused by reflections that travel backwards through the system and create ghost images. AR coatings are especially important for systems containing multiple transmitting optical elements.

The second section 60 of the top side 52 includes a beam splitter with transmittance and reflectance. A beam splitter is an optical device which can split incident light at a designated ratio into two separate beams. For example, the beam splitter may direct one beam along the first beam path 42 and another beam along the second beam path 40. Transmittance is the amount of light transmitted by a sample and is mathematically related to absorbance, and reflectance pertains to the amount of light that reflects from the surface of a sample.

Multiple reflections between two surfaces of a window introduce a fixed pattern error in optical measurements. One way to remove these spurious reflections, or cyclic errors, is to use a reasonably large wedge so that the interference fringes formed by the two surfaces are too dense for the detector to resolve. However, this method does not work if the wedge angle is small, e.g., several arcseconds. By tilting both the window and the return mirror properly, it is possible to remove the effect of multiple reflections of a window.

According to some embodiments, and as shown in FIG. 4, the multi-sectioned window 34 is wedge-shaped, such that a tilt angle of the wedge-shaped window 34, also referenced throughout as a multi-sectioned window 34, is greater than or less than a beam angle of the beam of light. According to some embodiments, for example, the tilt angle of the wedge-shaped window 34 is between 1° and 5°. According to the exemplary embodiment, the tilt angle 49 may be 2°, and the wedge-shaped window 34 itself may be tilted at an angle 48 of 15°, relative to horizontal. Windows are generally optical elements with two parallel planar surfaces, while wedges are optical elements that have two planar surfaces with one face angled in comparison to the other. Optical windows help isolate different physical environments while allowing light to pass. Wedge-shaped windows can vary greatly, such as, for example, with respect to material, transmission, configuration, wavefront distortion, parallelism and resistance to certain environments.

The present disclosure comprises methods and apparatus for reducing subharmonic cyclic errors by rotating by a small angle an interferometer or elements thereof. The rotation of the interferometer or selective elements thereof introduces a corresponding small angle between a subharmonic type spurious beam that subsequently interferes with either the reference or measurement beam so that the fringe contrast of the interference terms between the subharmonic spurious beam and either the reference or measurement beam is reduced by a required factor for a given use application thereby reducing nonlinearities in the phase signal. A subharmonic type spurious beam is one that results in a subharmonic cyclic error if not otherwise compensated or eliminated.

The cyclic error of a homodyne interferometer is caused mainly by phase mixing due to the imperfection of polarizing optical components such as polarizing beam splitters. The preamplifier-gains condition for removing the cyclic error may be based on the relationship between these imperfect optical characteristics and the cyclic error and found the preamplifier-gains condition for removing the cyclic error. This demonstrates the cyclic error correction method experimentally and shows that the method can be applied in real time. Results obtained are 0.04-nm cyclic errors, with a standard deviation above 5 micron.

The cyclic errors arise as a consequence of mixing of spurious optical and electrical signals in beam launchers that are subsystems of interferometers. The conventional approach to measurement of cyclic error involves phase measurements and yields values precise to within about 10 pm over air optical paths at laser wavelengths in the visible and near infrared.

According to Applicant's disclosure, the rotation of the interferometer or selective elements thereof introduces a corresponding small angle between a subharmonic type spurious beam that subsequently interferes with either the reference or measurement beam so that the fringe contrast of the interference terms between the subharmonic spurious beam and either the reference or measurement beam is reduced by a required factor for a given use application thereby reducing nonlinearities in the phase signal.

The degree of overlap of a beam caused by reflection at the output surface and the output beam depends on wedge angle, x, the diameter of the beam, and the beam's path length from output surface to a detector used to monitor the output beam. Accordingly, for relatively large diameter beams and/or interferometers having relatively short beam paths from output surface to the detector, the wedge angle can be increased to reduce this overlap. In some embodiments, x can be about 0.1° or more (e.g., about 0.5° or more, about 1° or more). Typically, x is about 10° or less. In some embodiments, x is about 3°.

The multi-sectioned window of the present disclosure achieves combined functionalities, whereas previous designs do not teach or suggest such an arrangement. As discussed above, fringes may be generated using a wedge-shaped window to overlap and reduce or minimize cyclic error. Also provided is the ability to control power. Overall, Applicant's design requires fewer components, is more cost efficient, requires less space in that the single multi-segment window will require less mounting space than two or more single-segment windows collectively required to perform the same function, and exhibits excellent performance.

The invention claimed is:

1. An optical head for a spectroscopic device, comprising:
a light source configured to produce a beam of light;
a reference signal detector;
a signal detector;
a mirror positioned to reflect the beam of light from the light source toward a multi-sectioned window;
the multi-sectioned window having a top side and a bottom side, wherein the bottom side includes an AR coating and the top side has a first section including an AR coating and a second section including a beam splitter with transmittance and reflectance;
wherein the multi-sectioned window is wedge-shaped;
a first beam path for the beam of light defined by the mirror, the second section of the top side of the multi-sectioned window, and the reference signal detector; and
a second beam path for the beam of light defined by the mirror, the second section of the top side of the multi-sectioned window, a medium contained in the spectroscopic device, an additional mirror reflecting the second beam path back through the medium, the first section of the multi-sectioned window, and the signal detector.

2. The optical head of claim 1, wherein a tilt angle of the wedge-shaped window is less than a beam angle of the beam of light.

3. The optical head of claim 1, wherein a tilt angle of the wedge-shaped window is greater than a beam angle of the beam of light.

4. The optical head of claim 1, wherein a tilt angle of the wedge-shaped window is between 1° and 5°.

5. The optical head of claim 1, wherein a component of the optical head includes a dielectric coating.

6. The optical head of claim 1, wherein a component of the optical head includes a partially reflective metallic coating.

7. The optical head of claim 1, wherein a component of the optical head includes a beam splitting element.

8. The optical head of claim 7, wherein the beam splitting element is one of a diffractive beam splitter, a holographic beam splitter, or a diffraction-grating beam splitter.

9. The optical head of claim 1, wherein a component of the optical head includes an acousto-optical component or an electro-optical component.

10. A method for operating a spectroscopic device, comprising:
providing a light source configured to produce a beam of light;
providing a reference signal detector;
providing a signal detector;
providing a multi-sectioned window, wherein the multi-sectioned window has a top side and a bottom side, wherein the bottom side includes an AR coating and the top side has a first section including an AR coating and a second section including a beam splitter with transmittance and reflectance;
wherein the multi-sectioned window is wedge-shaped;
directing the beam of light toward the multi-sectioned window;
reflecting a portion of the beam of light from the second section of the top side of the multi-sectioned window to the reference signal detector;
transmitting an additional portion of the beam of light through the second section of the multi-sectioned window through a medium contained in the spectroscopic device; and
reflecting the additional portion of the beam of light back through the medium and through the first section of the top side of the multi-sectioned window to the signal detector.

11. The method of claim 10, wherein a tilt angle of the wedge-shaped window is less than a beam angle of the beam of light.

12. The method of claim 10, wherein a tilt angle of the wedge-shaped window is between 1° and 5°.

13. The method of claim 10, wherein a component of the optical head includes a dielectric coating.

14. The method of claim 10, wherein a component of the optical head includes a partially reflective metallic coating.

15. The method of claim 10, wherein a component of the optical head includes a beam splitting element.

16. The method of claim 15, wherein the beam splitting element is one of a diffractive beam splitter, a holographic beam splitter, or a diffraction-grating beam splitter.

17. The method of claim 10, wherein a component of the optical head includes an acousto-optical component or an electro-optical component.

* * * * *